(12) United States Patent
Kobayashi (10) Patent No.: US 11,252,501 B2
(45) Date of Patent: Feb. 15, 2022

(54) IN-VEHICLE DEVICE AND AUDIO OUTPUT SYSTEM

(71) Applicant: SOCIONEXT INC., Kanagawa (JP)

(72) Inventor: Katsumi Kobayashi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 17/037,499

(22) Filed: Sep. 29, 2020

(65) Prior Publication Data

US 2021/0014604 A1 Jan. 14, 2021

Related U.S. Application Data

(63) Continuation of application No. PCT/JP2018/015445, filed on Apr. 12, 2018.

(51) Int. Cl.
| | |
|---|---|
| *H04R 1/32* | (2006.01) |
| *G10K 11/20* | (2006.01) |
| *B60R 11/00* | (2006.01) |
| *H04R 1/34* | (2006.01) |
| *B60R 11/02* | (2006.01) |
| *G10K 11/18* | (2006.01) |

(52) U.S. Cl.
CPC .............. *H04R 1/323* (2013.01); *G10K 11/20* (2013.01); *H04R 1/345* (2013.01); *B60R 11/00* (2013.01); *B60R 11/0217* (2013.01); *G10K 11/18* (2013.01)

(58) Field of Classification Search
CPC .......... H04R 1/028; H04R 1/32; H04R 1/323; H04R 1/34; H04R 1/345; H04R 2499/13; H04R 3/00; B60R 1/12; B60R 2001/1276; B06R 11/00; B06R 11/02; B06R 11/0217; G10K 11/18; G10K 11/20; G10K 11/26; G10K 11/28; G10K 11/357
See application file for complete search history.

(56) References Cited

U.S. PATENT DOCUMENTS

| | | | | |
|---|---|---|---|---|
| 4,362,907 | A * | 12/1982 | Polacsek | B60R 11/0205 296/97.5 |
| 2006/0109989 | A1* | 5/2006 | Linhard | H04R 1/345 381/160 |
| 2013/0142353 | A1* | 6/2013 | Silzle | B60R 11/0217 381/86 |

(Continued)

FOREIGN PATENT DOCUMENTS

| | | |
|---|---|---|
| JP | S61-047714 U | 3/1986 |
| JP | S61-085987 U | 6/1986 |

(Continued)

OTHER PUBLICATIONS

International Search Report and Written Opinion issued in corresponding International Application No. PCT/JP2018/015446, dated Jun. 5, 2018. with English translation.

(Continued)

*Primary Examiner* — Thang V Tran
(74) *Attorney, Agent, or Firm* — McDermott Will & Emery LLP (57) ABSTRACT

An in-vehicle device is installed in a moving body. The in-vehicle device includes: a speaker unit configured to emit sound in a first direction; a reflector unit configured to reflect the sound in a second direction different from the first direction; and a mechanical unit configured to change the second direction.

6 Claims, 13 Drawing Sheets

(56) References Cited

U.S. PATENT DOCUMENTS

| | | | |
|---|---|---|---|
| 2014/0133673 A1* | 5/2014 | Silzle | H04R 3/12 381/86 |
| 2015/0086035 A1* | 3/2015 | Shin | B60R 11/0217 381/86 |
| 2018/0317004 A1* | 11/2018 | Sheedy | H04R 1/025 |
| 2020/0322745 A1* | 10/2020 | Kobayashi | H04S 7/302 |

FOREIGN PATENT DOCUMENTS

| | | |
|---|---|---|
| JP | 2002-178752 A | 6/2002 |
| JP | 2006-069432 A | 3/2006 |
| JP | 2008-162486 A | 7/2008 |
| JP | 2011-165114 A | 8/2011 |
| JP | 2012-231449 A | 11/2012 |

OTHER PUBLICATIONS

Ky Plaza, "Hands-free Call Kit, Product Code: BT-LD-168", [online], [searched on Feb. 20, 2018], Internet <URL: https://store.shopping.yahoo.co.jp/kyplaza634s/bt-ld-168.html> partial translation.

Notice of Reasons for Refusal issued in corresponding Japanese Patent Application No. 2020-513026, dated Oct. 5, 2021; with English translation.

\* cited by examiner

IN-VEHICLE DEVICE AND AUDIO OUTPUT SYSTEM

CROSS-REFERENCE TO RELATED APPLICATION

This application is a continuation of International Application PCT/JP2018/015445 filed on Apr. 12, 2018 and designated the U.S., the entire contents of which are incorporated herein by reference.

FIELD

The present invention relates to an in-vehicle device and an audio output system.

BACKGROUND

Conventionally, a technique for providing an acoustic device in a vehicle has been known.

Specifically, an acoustic device is known, which can be installed in a sun visor or the like and outputs sounds distributed from a portable terminal via radio communication using Bluetooth (registered trademark).

RELATED-ART DOCUMENT

Non-Patent Document

[Non-Patent Document 1] KY PLAZA, "Hands-free Call Kit, Product Code: BT-LD-168", [online], [searched on Feb. 20, 2018], Internet <URL:https://store.shopping.yahoo.co.jp/kyplaza634s/bt-ld-168.html>

SUMMARY

An in-vehicle device according to one aspect of the present invention is installed in a moving body. The in-vehicle device includes: a speaker unit configured to emit sound in a first direction; a reflector unit configured to reflect the sound in a second direction different from the first direction; and a mechanical unit configured to change the second direction.

DESCRIPTION OF THE EMBODIMENTS

Hereinafter, embodiments will be described with reference to the accompanying drawings. In the present specification and the drawings, for the components having substantially the same functional configuration, the same reference numerals are assigned, and overlapping descriptions may be omitted.

<Example of System Configuration of Audio Output System 120>

Figure 1:
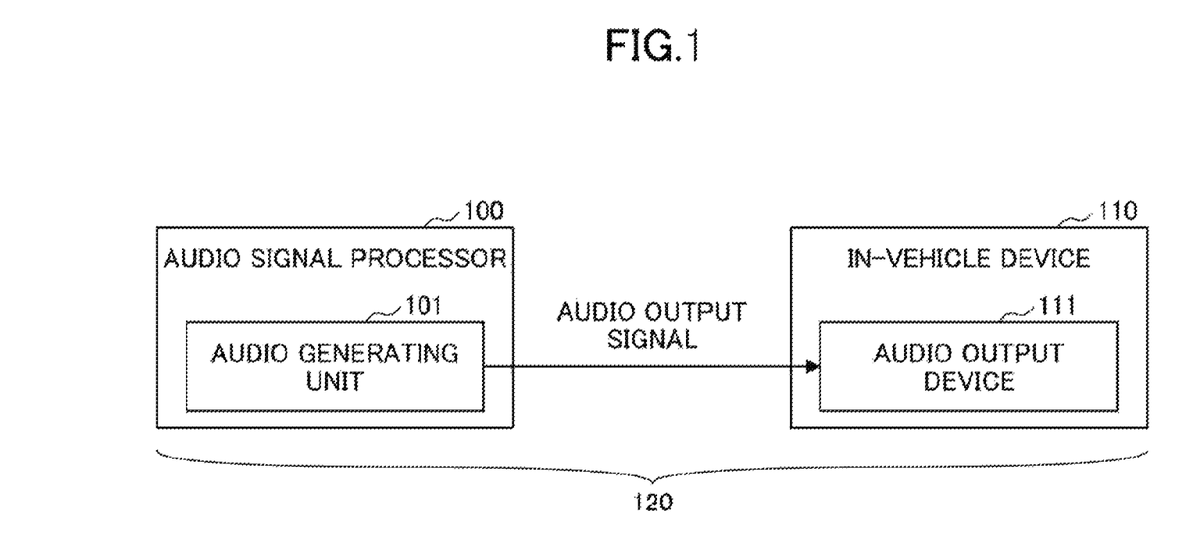
FIG. 1 is a diagram illustrating an overall configuration of an audio output system according to an embodiment.

FIG. 1 is a diagram illustrating an overall configuration of an audio output system 120 according to an embodiment of the present invention. The audio output system 120 is installed in a moving body such as a vehicle. For example, the audio output system 120 includes an in-vehicle device 110 according to the present embodiment and an audio signal processor 100.

As illustrated in FIG. 1, the audio output system 120 includes the audio signal processor 100 and the in-vehicle device 110. The audio signal processor 100 is connected to an audio output device 111 by cable connection or by wireless connection, so that signals, such as audio output signals, can be transmitted and received.

A speech generator program or the like is pre-installed in the audio signal processor 100. When the program is executed, the audio signal processor 100 functions as an audio generating unit 101.

The audio generating unit 101 generates an audio output signal, and transmits the generated audio output signal to the audio output device 111. The audio output device 111 receives the audio output signal transmitted from the audio generating unit 101. Upon receipt of the audio output signal as described above, the audio output device 111 emits sound.

The audio output system 120 may further include devices other than those illustrated in the drawings.

<Example of Installation of Audio Output System 120>

Next, an example of installation of each device of the audio output system 120 in a vehicle interior will be described.

Figure 2:
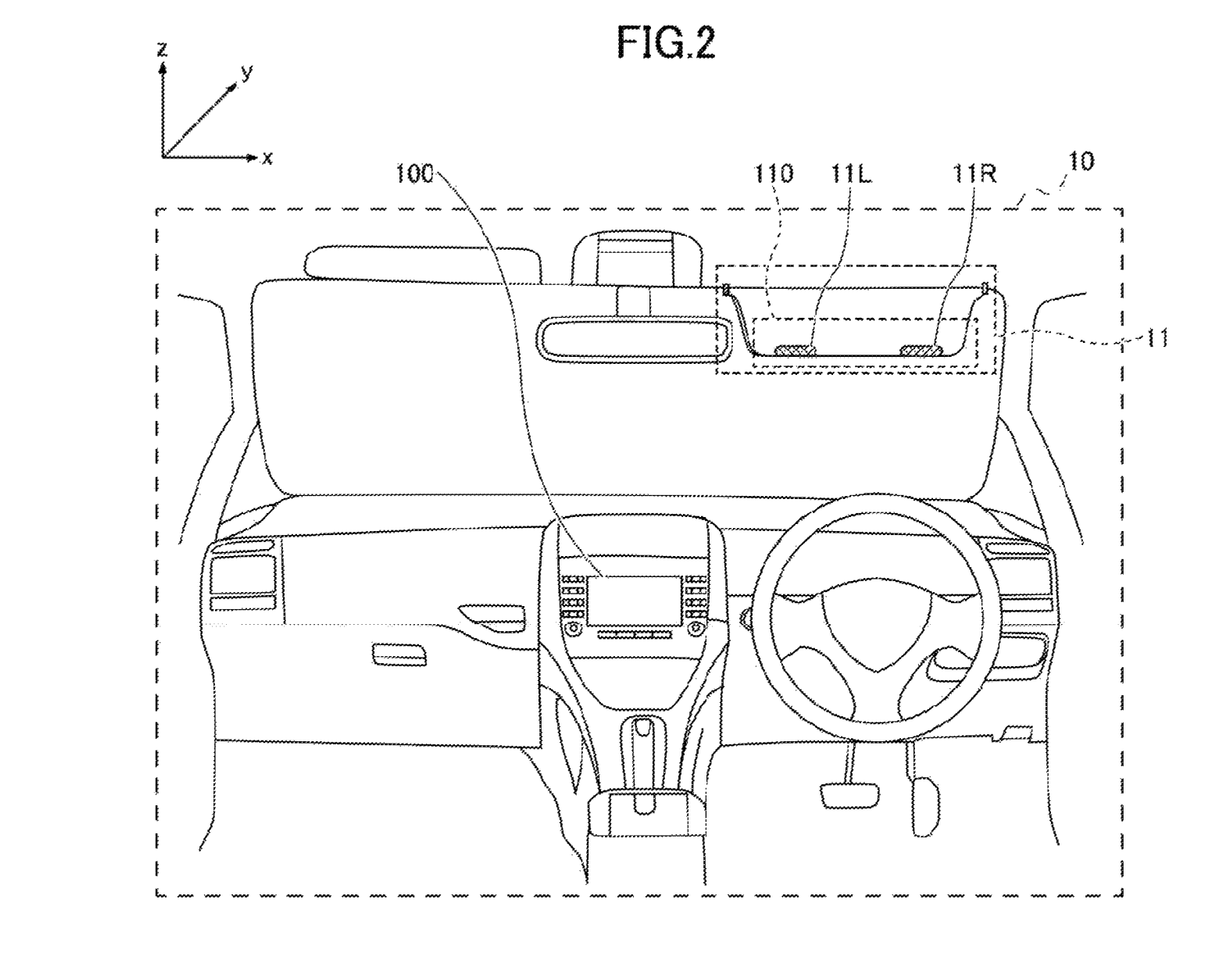
FIG. 2 is a diagram illustrating an installation example, in a vehicle interior, of each device of the audio output system according to the present embodiment.

FIG. 2 is a diagram illustrating an installation example, in a vehicle interior, of each device of the audio output system 120 according to the present embodiment. In the example illustrated in FIG. 2, a navigation device, in which functions of the audio signal processor 100 are implemented, is installed at, for example, the center console of a vehicle interior.

Hereinafter, a direction to which a vehicle 10 proceeds (the depth direction in the drawing) is referred to as a "y-axis". Also, a horizontal direction (the right hand direction in the drawing) perpendicular to the y-axis is defined to be an "x-axis". In addition, a vertical direction (the upward direction in the drawing) perpendicular to the y-axis is defined to be a "z-axis".

The audio signal processor 100 is a device having the following hardware configuration.

<Example of Hardware Configuration of Audio Signal Processor 100>

Figure 3:
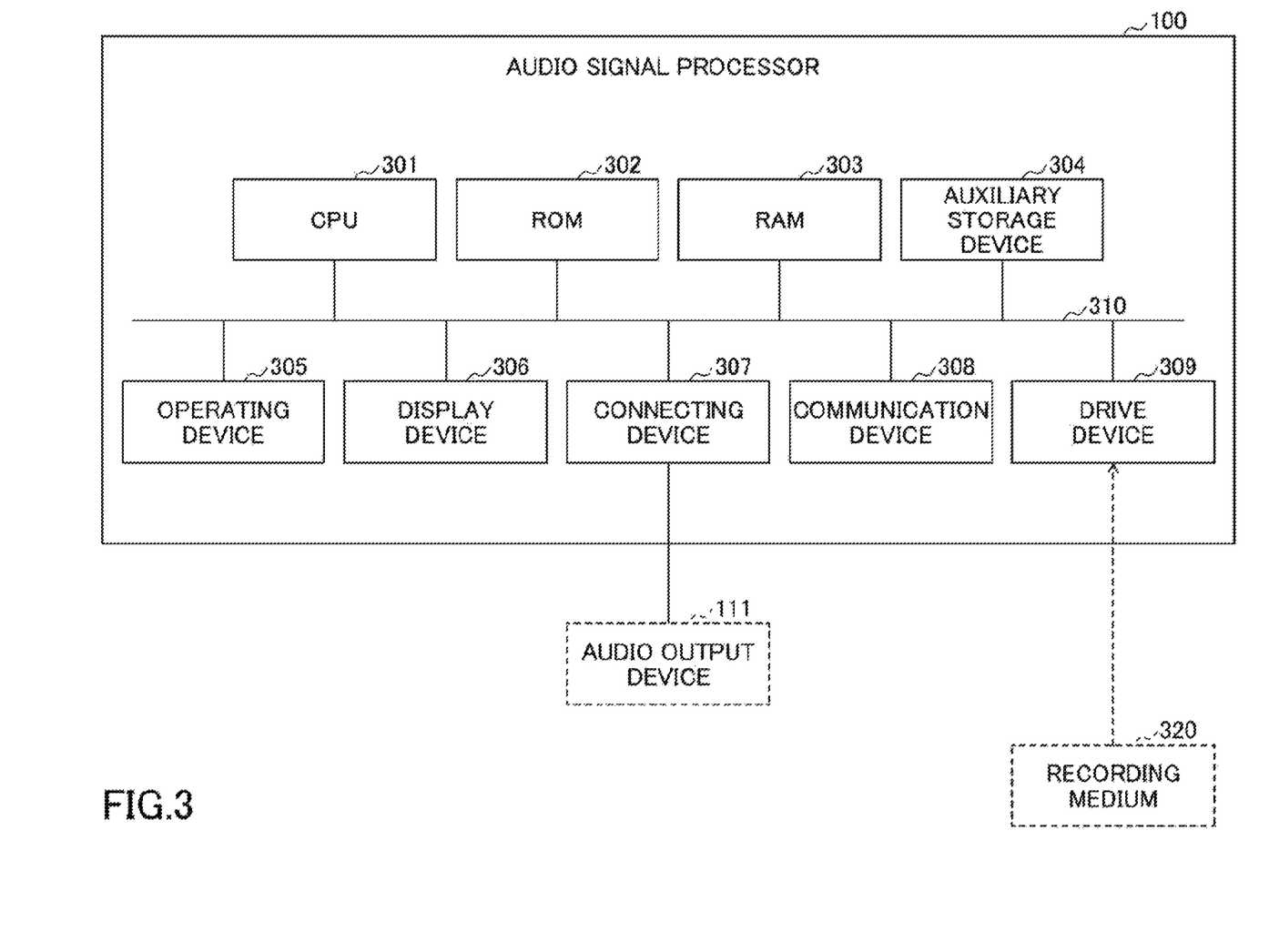
FIG. 3 is a diagram illustrating an example of a hardware configuration of an audio signal processor according to the present embodiment.

FIG. 3 is a diagram illustrating an example of the hardware configuration of the audio signal processor 100 according to the present embodiment.

As illustrated in FIG. 3, the audio signal processor 100 includes, for example, a central processing unit (CPU) 301, a read only memory (ROM) 302, a random access memory (RAM) 303, and the like. That is, the CPU 301, the ROM 302, the RAM 303, and the like configures what is called a computer.

The audio signal processor 100 also includes an auxiliary storage device 304, an operating device 305, a display device 306, a connecting device 307, a communication device 308, and a drive device 309. Each of the hardware of the audio signal processor 100 is connected to each other via a bus 310.

The CPU 301 is an arithmetic and control device that executes various programs (for example, an audio generation program) installed in the auxiliary storage device 304.

The ROM 302 is a non-volatile memory. For example, the ROM 302 functions as a main storage device that stores programs and the like necessary for the CPU 301 executing the various programs installed in the auxiliary storage device 304. Specifically, the ROM 302 stores a boot program such as BIOS (Basic Input/Output System) or EFI (Extensible Firmware Interface).

The RAM 303 is a volatile memory such as a dynamic random access memory (DRAM) or a static random access memory (SRAM). For example, the RAM 303 functions as a main storage device that provides a work area for the various programs installed in the auxiliary storage device 304, which is used when the various programs are executed by the CPU 301.

The auxiliary storage device 304 stores the various programs, and stores parameters used for executing the various programs.

The operating device 305 receives various instructions from a driver. Specifically, the operating device 305 may be a variety of button switches or predetermined operating devices. The operating device 305 may be a touch panel integrally formed with the display device 306.

The connecting device 307 is used for connecting the audio signal processor 100 with an external device such as the audio output device 111. For example, the connecting device 307 transmits, to the audio output device 111, audio output signals generated when the various programs are executed by the CPU 301. The connection with the audio output device 111 may be made through wired connection, or through wireless connection using a short-range radio communication technology such as Bluetooth (registered trademark). The communication device 308 is a communication device for communicating with the network.

The drive device 309 is a device into which a recording medium 320 is loaded. The recording medium 320 includes a medium for optically, electrically, or magnetically recording information, such as a CD-ROM (Compact Disc-ROM), a flexible disk, or a magneto-optical disk. The recording medium 320 may also include a semiconductor memory or the like for electrically recording information, such as a ROM or a flash memory.

For example, by a distributed recording medium 320 being loaded into the drive device 309 and by the various programs recorded in the recording medium 320 being read out by the drive device 309, the various programs are installed into the auxiliary storage device 304.

<Example Configuration of in-Vehicle Device 110>

Hereinafter, an example will be described in which the in-vehicle device 110 is a device that is attached to the interior of a vehicle so as to reduce sunlight striking occupants in the vehicle, what is called a "sun visor" 11.

If a speaker unit or the like is installed in a sun visor or the like, the direction of the speaker unit or the like with respect to a listener (i.e., an occupant in a vehicle) is often changed together with the sun visor, in accordance with change in orientation of the sun visor with respect to the listener (hereinafter, the orientation of the sun visor may simply be referred to as the "orientation"). Sound includes various frequencies. If the frequency of a sound is low, the directivity of the sound is weak because sound of low frequency has a roundabout property. However, if the frequency of a sound is high, the straight advancing ability of the sound is relatively strong. Therefore, when the sound output from the speaker is output toward a ceiling or the like in the vehicle, sound in a high frequency range is not likely to reach a person, and only sound in a low frequency range is transmitted to a person. As a result, sound of biased frequency components is transmitted to a person in the vehicle, and it is difficult to transmit high quality sound to the person. In addition, strict requirements of reliability and the like are imposed to in-vehicle devices as compared to other consumer products. Therefore, types of parts that can be used for the in-vehicle device are limited.

One aspect of the present invention aims at transmitting high quality sound to a listener by the in-vehicle device.

In the following description, as illustrated in the drawings, an example in which an audio output device 111, such as a speaker, is installed in each of the right portion 11R of the sun visor 11 and the left portion 11L of the sun visor 11 will be described. In addition, configurations of the left portion 11L and the right portion 11R are identical, for example. Hereinafter, the configuration of the left portion 11L will be described as an example, and the description of the right portion 11R will be omitted.

Figure 4:
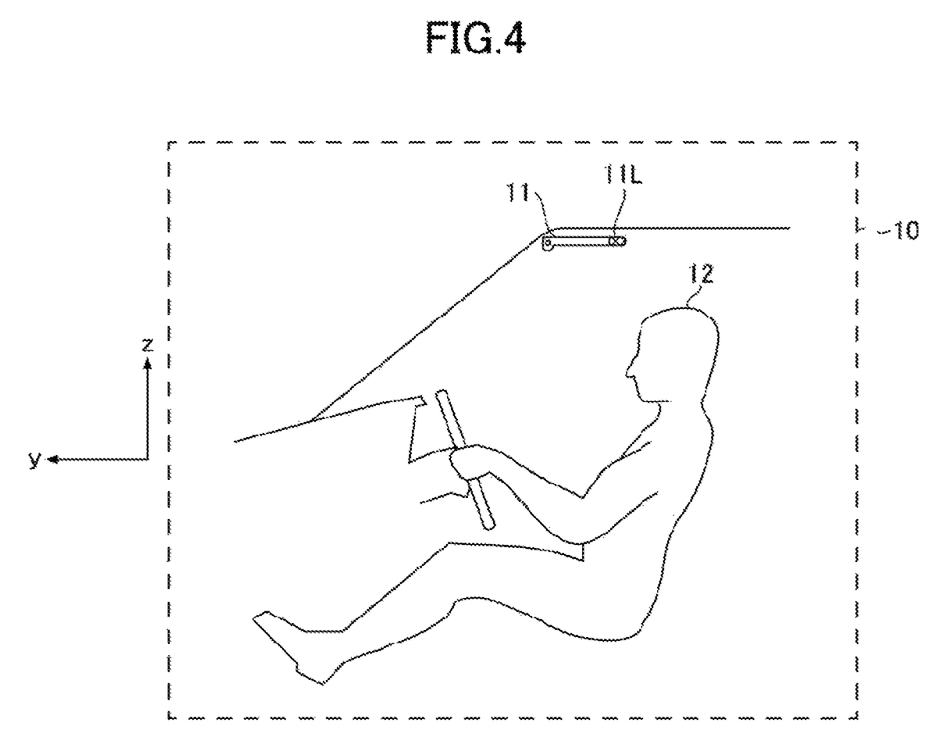
FIG. 4 is a cross-sectional view illustrating a first usage example of a sun visor according to the present embodiment.

FIG. 4 is a cross-sectional view illustrating a first usage example of the sun visor 11 according to the present embodiment. As illustrated, an occupant, such as a driver 12, controls a travelling direction and the like of the vehicle 10 by using a steering device.

The illustrated state is an example in which the driver 12 does not attempt to block sunlight or the like using the sun visor 11. That is, the illustrated state is an example of a state in which the sun visor 11 is in what is called an "unused" state. In this case, for example, the sun visor 11 is fixed to be substantially horizontal (parallel) with respect to the travelling direction (y-axis direction in the drawing). Meanwhile, the sun visor 11 may be used while it is fixed at the following angles.

Figure 5:
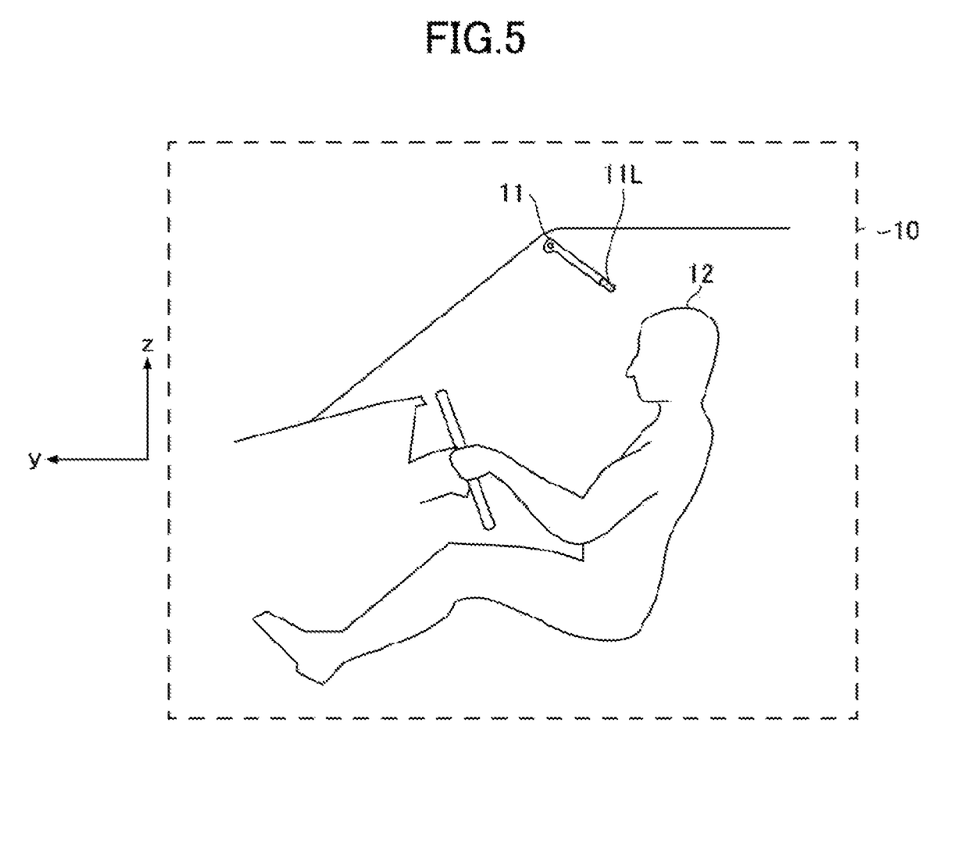
FIG. 5 is a cross-sectional view illustrating a second usage example of the sun visor according to the present embodiment.

FIG. 5 is a cross-sectional view illustrating a second usage example of the sun visor 11 according to the present embodiment.

Figure 6:
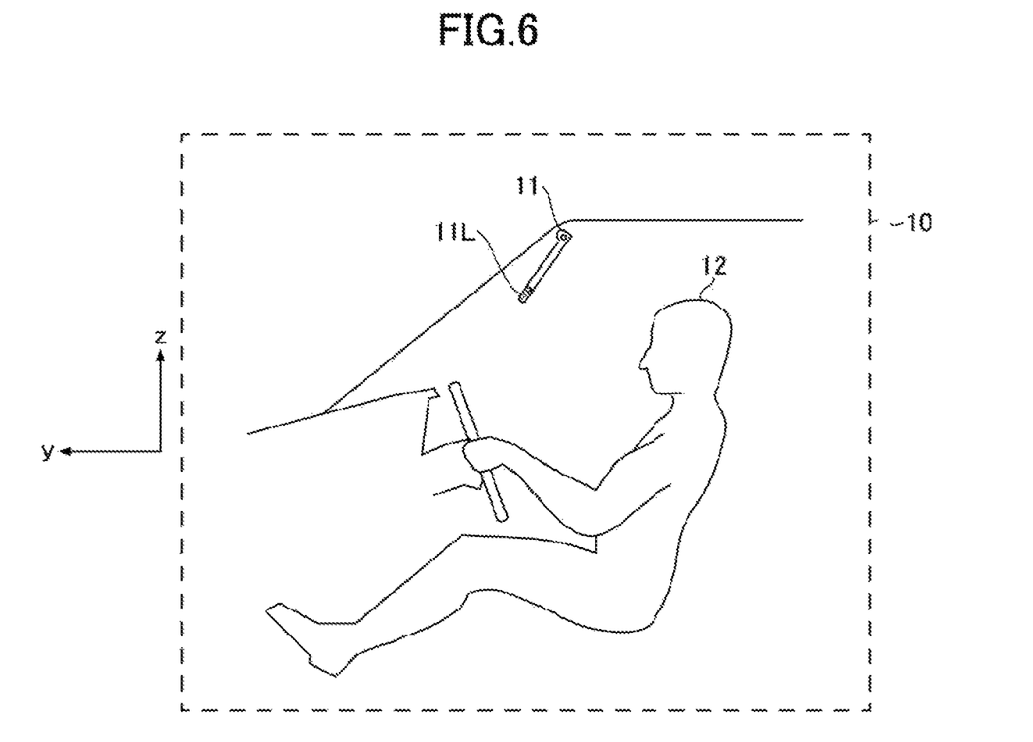
FIG. 6 is a cross-sectional view illustrating a third usage example of the sun visor according to the present embodiment.

FIG. 6 is a cross-sectional view illustrating a third usage example of the sun visor 11 according to the present embodiment.

In each of the examples illustrated in FIGS. 4 to 6, orientation of the sun visor 11 differs. Hereinafter, although three examples of orientation of the sun visor 11 illustrated in FIGS. 4 to 6 will be described, the sun visor 11 may be used in a state other than the illustrated states. That is, the sun visor 11 can be changed to desired orientation by operations of the driver 12.

Also, the left portion 11L is provided with a speaker or the like, as described below.

<Example of Installation of Speaker SP>

Figure 7:
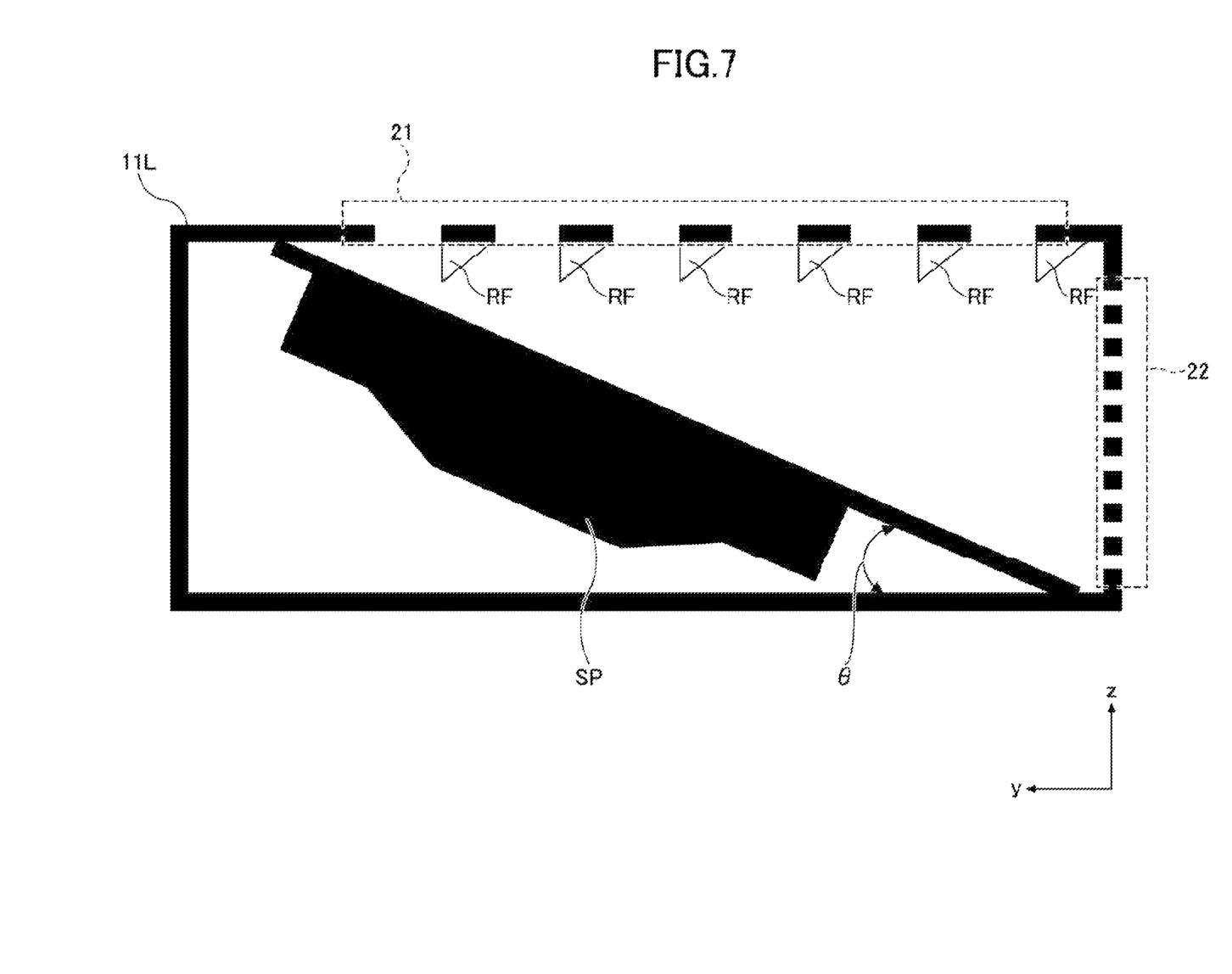
FIG. 7 is a cross-sectional view illustrating an installation example of a speaker according to the present embodiment.

FIG. 7 is a cross-sectional view illustrating an installation example of a speaker unit SP according to the present embodiment. The speaker unit SP may also be referred to as a "speaker SP". First, it is preferable that multiple openings are provided in the left portion 11L. Specifically, in the example illustrated in FIG. 7, a first opening part 21 and a second opening part 22 each having one or more holes are provided. As illustrated in FIG. 7, each of the first opening part 21 and the second opening part 22 is directed in a different direction, such as an upward direction (z-axis direction in the drawing) and a horizontal direction (y-axis direction in the drawing). In the following description, the first opening part 21 may be referred to as a "first opening 21", and the second opening part 22 may be referred to as a "second opening 22". The number of openings may be three or more. In addition, a combination of directions, to which respective openings are directed, may be other than the combination illustrated.

If there are multiple openings in the sun visor 11 and each of the openings faces a different direction as described above, sound emitted from the speaker SP is output from at least one of the openings. That is, even if any one of the openings is blocked in accordance with change of orientation of the sun visor 11, if multiple openings are provided, sound can be output from the openings other than the opening that is blocked. Specifically, in the state illustrated in FIG. 4, the first opening 21 is blocked by a ceiling of the vehicle 10. However, because the second opening 22 is provided, sound can be output from the second opening 22. Thus, multiple openings can transmit high-quality sound to a listener (i.e., an occupant in the vehicle 10) even if the orientation of the sun visor 11 is changed.

The speaker SP may preferably be installed as illustrated, such that the speaker SP has a predetermined angle θ to the horizontal direction (y-axis direction in the drawing). The predetermined angle θ is, for example, approximately 45 degrees. However, the predetermined angle θ may be determined by considering the diameter and the like of the speaker SP. As described above, the speaker SP may preferably be installed at the predetermined angle θ with respect to the opening, i.e., obliquely. In such an installation, the speaker SP can output sound to any of the multiple openings. Accordingly, even if the orientation is changed, the speaker SP can output sound from at least one of the opening parts.

Further, for example, reflectors RF are provided near the first opening 21 as illustrated. In the following description, in a case in which multiple reflectors RF are installed, a set of the multiple reflectors RF may be referred to as a "reflector unit". The reflectors RF are, for example, formed of plastic, iron, or aluminum. However, material of the reflectors RF is not limited to plastic, iron, or aluminum. For example, any material that tends to reflect sound, such as a material having a hard and smooth surface, may be used.

<Example of Reflector RF>

If the reflector RF is provided, the following effects are achieved.

Figure 8:
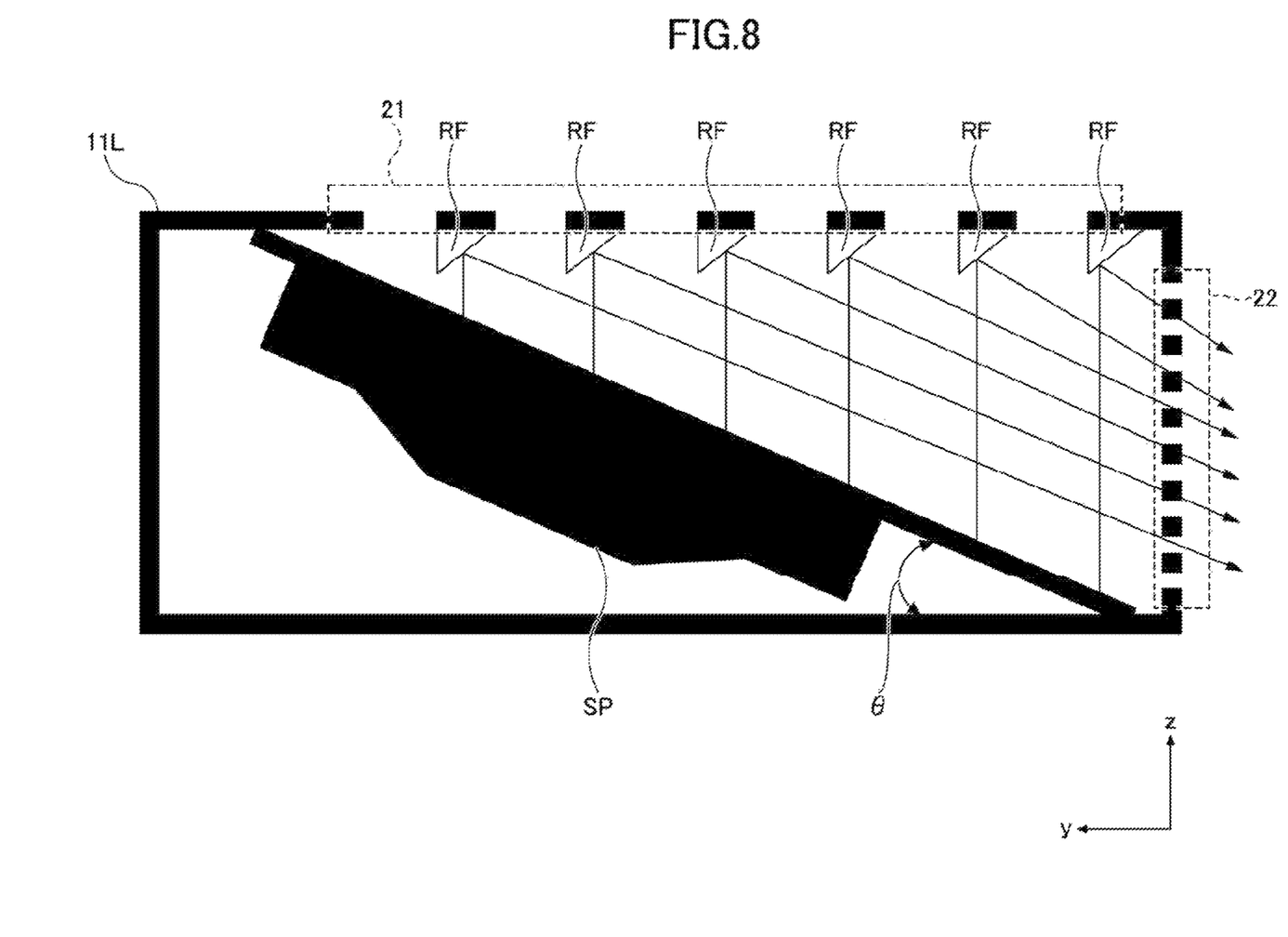
FIG. 8 is a cross-sectional view illustrating an example of effects of the present invention.

FIG. 8 is a cross-sectional view illustrating an example of effects according to the present invention. Hereinafter, as an example, a case in which the speaker SP is installed as illustrated in FIG. 7 and in which the orientation of the sun visor 11 is as illustrated in FIG. 4 will be described.

In this state, as illustrated in the drawing, sound emitted from the speaker SP toward the first opening 21 is reflected by the reflectors RF and the direction of the sound is changed. The sound is thus output from the second opening 22.

In this example, first, the speaker SP emits sound to a direction toward the first opening 21 (upward direction in the drawing). Hereinafter, the direction toward the first opening 21 may be referred to as a first direction. The reflectors RF reflect the sound having been emitted toward the first direction, such that the sound is directed toward the second opening 22 (right direction in the drawing), which is an example of a second direction. As described above, the reflectors RF reflect sound such that the sound incident on the reflector RF is directed to a different direction.

Further, in a case in which the orientation of the sun visor 11 is as illustrated in FIG. 4, even if sound is output from the upper side, e.g. the first opening 21, because the ceiling is at the first opening 21, the sound that is emitted from the speaker SP and is output from the first opening 21 is not easily transmitted to the listener. In contrast, if the sound is output from the second opening 22 by reflection, because the sound is directed to the listener, the sound can be transmitted to the listener with high quality.

<Example of Mechanical Unit>

For example, the reflector RF is configured such that an angle of reflection of sound incident on the reflector RF can be changed by a mechanical unit described below. In other words, the reflector RF can change a direction of sound incident on the reflector RF (aforementioned second direction). In the following description, the angle of reflection of sound incident on the reflector RF may also be referred to as a "reflection angle of the reflector RF".

Figure 9:
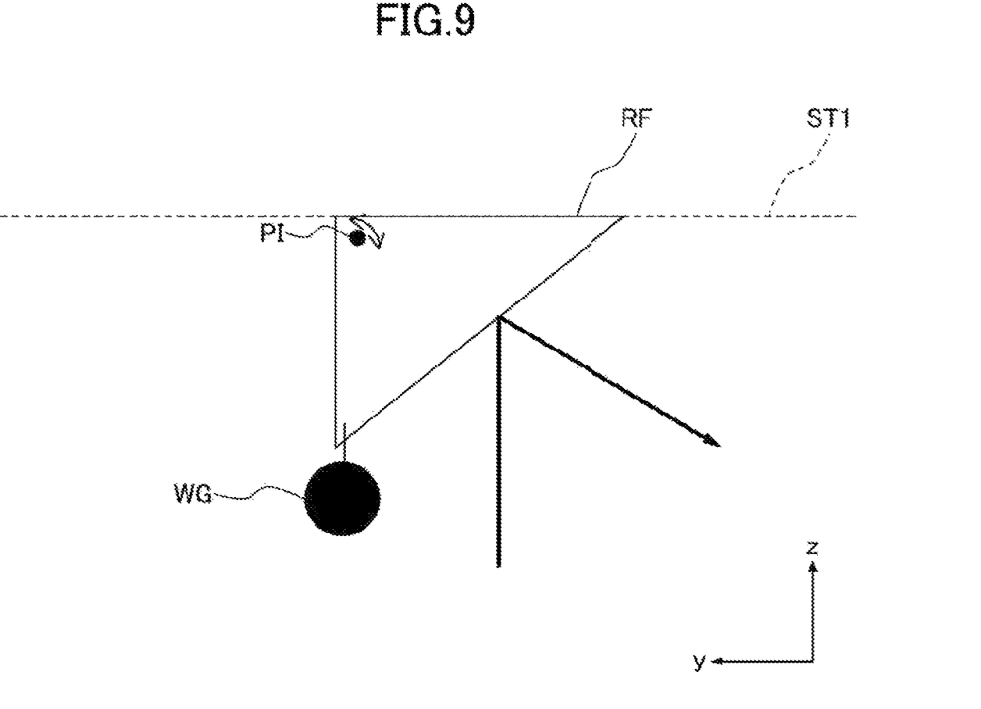
FIG. 9 is a cross-sectional view illustrating an example of a mechanical unit according to the present embodiment.

FIG. 9 is a cross-sectional view illustrating an example of the mechanical unit according to the present embodiment. First, as illustrated in FIG. 9, each of the reflectors RF is fixed by a pin PI for example in a rotatable manner. In addition, a weight WG is attached to each of the reflectors RF. If such a mechanical unit illustrated in the drawing is provided, the reflection angle of the reflector RF can be changed in accordance with the orientation of the sun visor 11.

The mechanical unit is not required to be configured by the weight WG and the pin PI illustrated in the drawing. That is, any types of mechanism may be employed as the mechanical unit of the sun visor 11, as long as the mechanism can change the reflection angle of the reflector RF in accordance with the orientation of the sun visor 11. For example, an installation position, shape, size, and connection configuration of the weight WG, and a position of the pin PI may be other than those illustrated in the drawing.

Specifically, in FIG. 9, the orientation of the sun visor 11 is substantially horizontal. That is, in FIG. 9, the sun visor 11 is in a state illustrated in FIG. 4 (hereinafter referred to as "horizontal state ST1").

For example, the orientation of the sun visor 11 is changed as follows.

Figure 10:
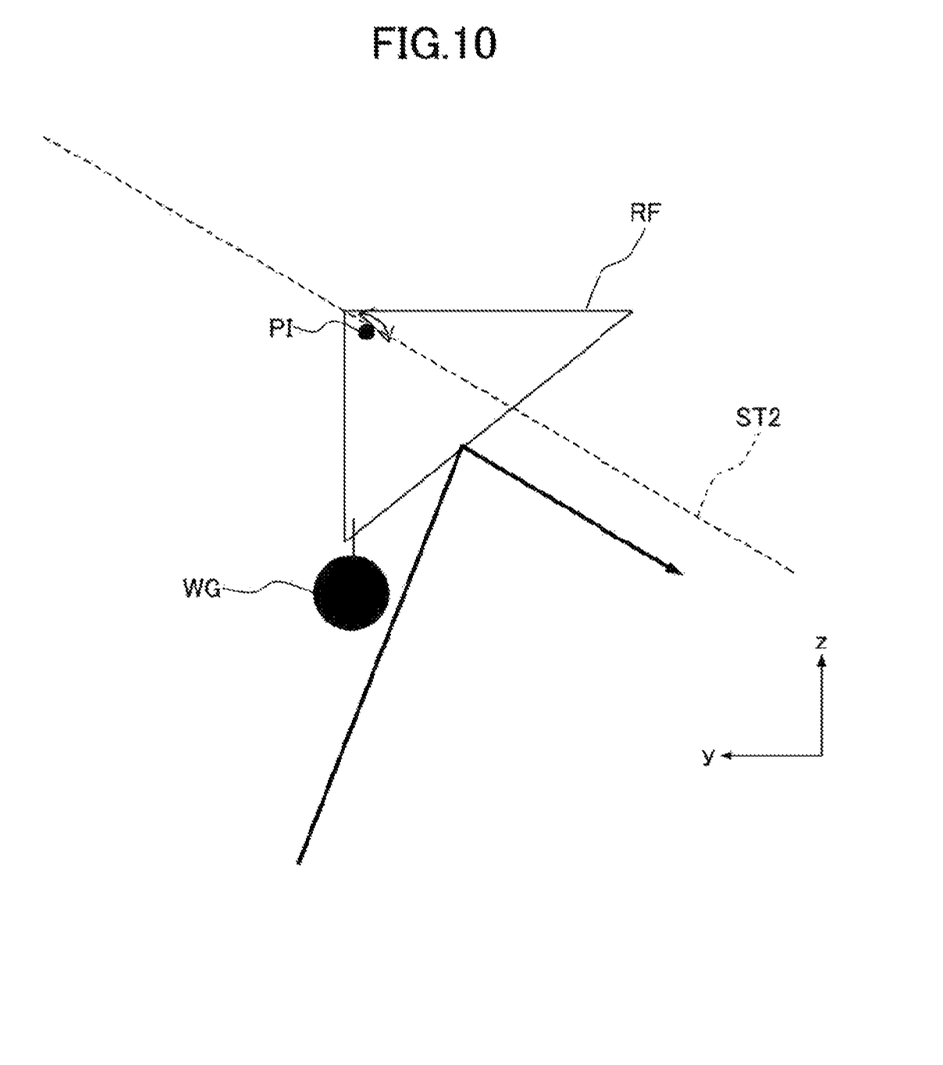
FIG. 10 is a cross-sectional view illustrating an example in which the sun visor is slanted.

FIG. 10 is a cross-sectional view illustrating an example in which the sun visor 11 is slanted. Compared to FIG. 9, FIG. 10 differs in that the orientation of the sun visor 11 is changed from the horizontal state ST1 to a slanted state (hereinafter referred to as an "oblique state ST2"). That is, FIG. 10 illustrates a state in which the sun visor 11 is as illustrated in FIG. 5, for example.

In the oblique state ST2, the reflector RF rotates about the pin PI because of the weight WG. Therefore, regardless of whether the sun visor 11 is in the horizontal state ST1 or in the oblique state ST2, sound incident on the reflector RF is reflected approximately in a direction (lower right direction in the drawings) in which the driver 12 is present. As described above, because the mechanical unit such as the weight WG is provided, the reflector RF changes the reflection angle in accordance with the orientation of the sun visor 11. Thus, in whatever orientation, the reflector RF can reflect the sound approximately in the direction where a listener such as the driver 12 is present.

Furthermore, for example, the mechanical unit may have the following configuration.

Figure 11:
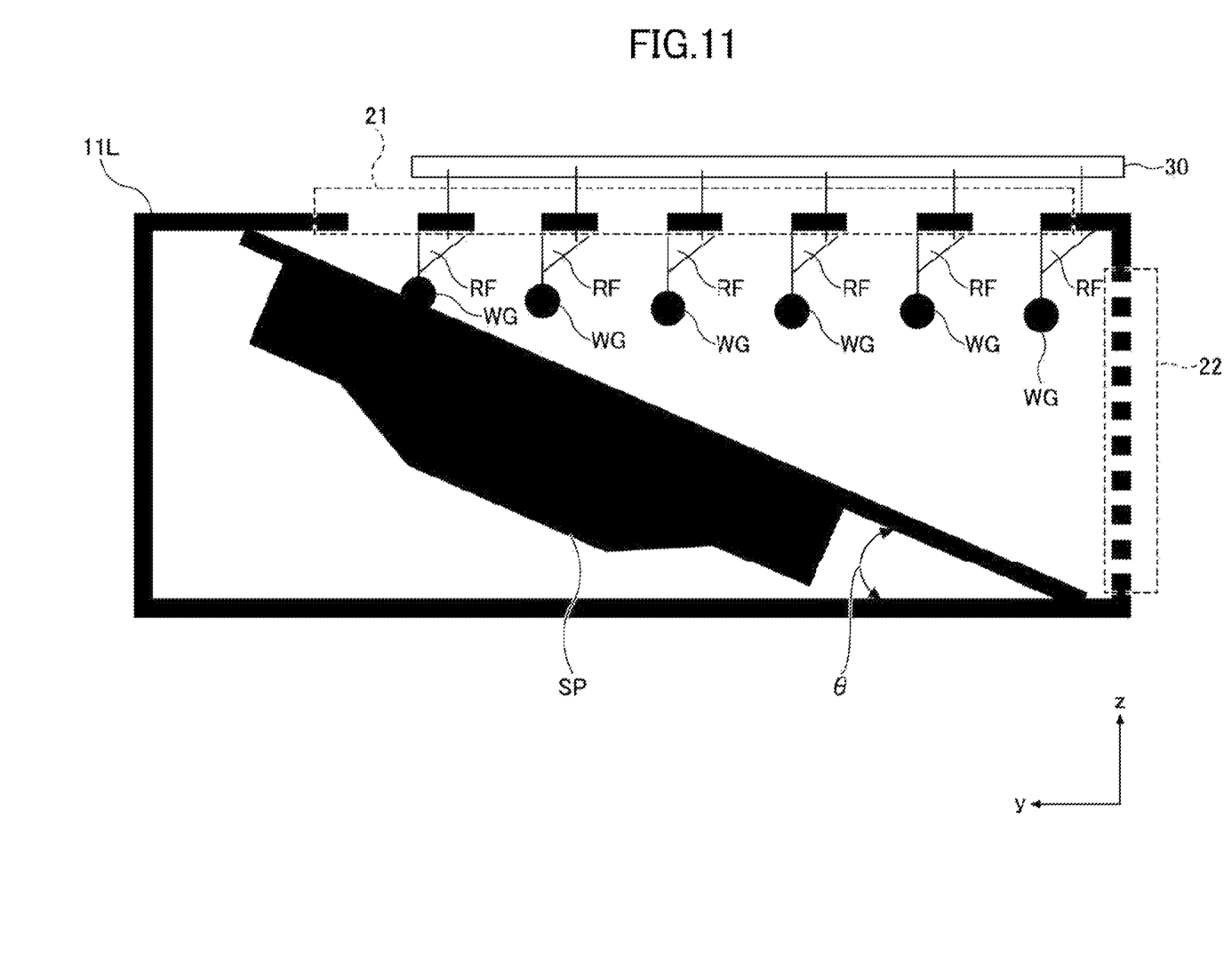
FIG. 11 is a cross-sectional view illustrating an example of a mechanical unit having an adjustment mechanism according to the present embodiment.

FIG. 11 is a cross-sectional view illustrating an example of a mechanical unit having an adjustment mechanism according to the present embodiment. As illustrated in FIG. 11, the in-vehicle device may include a connecting mechanism 30 that connects the multiple reflectors RF. As illustrated in FIG. 11, because the connecting mechanism 30 connects the multiple reflectors RF, the reflection angle of the multiple reflectors RF can be simultaneously adjusted when the driver 12 operates the connecting mechanism 30. That is, if the multiple reflectors RF are provided and if the mechanical unit is configured as described above, an occupant can easily adjust the reflection angle of the multiple reflectors RF.

Further, by the connecting mechanism 30, the reflection angle of the reflector RF can be adjusted. In other words, in a case in which the reflection angle is determined by the weight WG or the like, sound may be output toward a position deviated from the listener. Accordingly, by providing a mechanism capable of adjusting the reflection angle, such as the connecting mechanism 30 as illustrated in FIG. 11, the listener can adjust the deviation to a lesser extent.

It should be noted that the connecting mechanism 30 may not be located, shaped, or constructed as illustrated in FIG. 11. That is, any mechanism may be employed as the connecting mechanism 30 as long as the mechanism can simultaneously adjust part or all of the reflectors RF installed.

SUMMARY

As is obvious from the above description, the sun visor 11 according to the embodiment includes the reflector RF. The reflector RF reflects sound emitted from the speaker SP so that the sound having been directed to the first direction is directed to the second direction. The second direction, that is, the reflection angle, can be changed by a mechanical unit formed of parts such as the weight WG.

The orientation of the sun visor 11 may be changed, for example, as described below.

Figure 12:
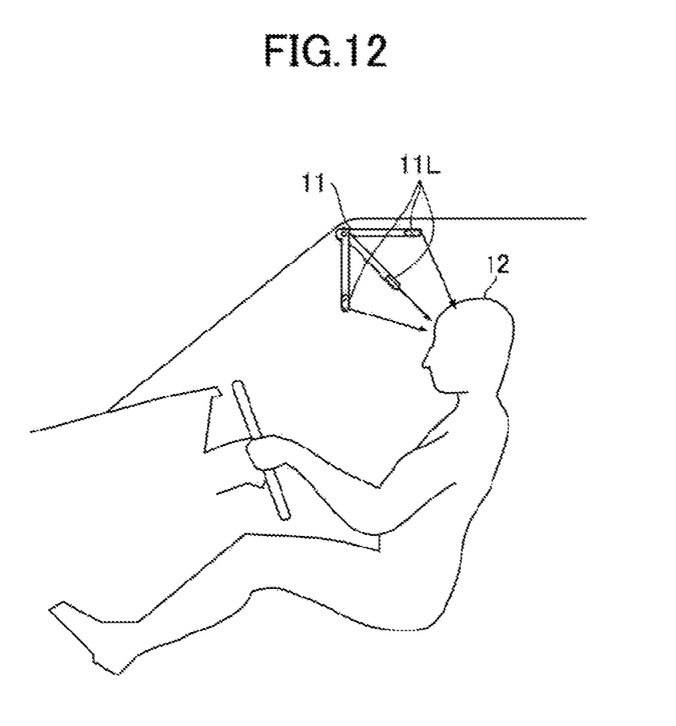
FIG. 12 is a diagram illustrating an example of how the orientation of the sun visor according to the present embodiment is changed.

FIG. 12 is a diagram illustrating an example of how the orientation of the sun visor 11 according to the present embodiment is changed. As illustrated, the sun visor 11 can take three different orientations, for example. In whatever orientation, the reflector RF outputs sound to the direction in which the driver 12 is present.

In addition, a mechanism for limiting a range, in which the reflector RF can rotate, may be provided so that an amount of rotation of the reflector RF does not exceed a predetermined angle. For example, in a case in which the orientation of the sun visor 11 is as illustrated in FIG. 6, it is desirable that sound is not reflected by the reflector RF and that the sound is output from the first opening 21. Therefore, in such a case, it is preferable that the first opening 21 is not blocked by the reflector RF or the weight WG. Therefore, it is desirable that a mechanism, such as a pawl or a projection, is provided in the vicinity of the reflector RF. If such a mechanism is further provided, the mechanism can suppress occurrence of a case in which output of sound from the first opening 21 is blocked by the reflector RF, even if the sun visor 11 is set to an orientation in which the reflector RF would rotate exceeding a certain amount unless the mechanism were provided.

According to the above-described configuration, regardless of the state of the sun visor 11, i.e., in whatever orientation the sun visor 11 is set, sound is more likely to be directed to the listener. Thus, the sun visor 11 can transmit high quality sound to the listener.

The speaker SP can be installed in both the left portion 11L and the right portion 11R, as illustrated in FIG. 2 for example. If the multiple speakers SP are provided, so-called 3D audio effects can be obtained. More desirably, the speaker SP provided in the left portion 11L and the speaker SP provided in the right portion 11R are arranged symmetrical to the listener.

The reflector RF may not be shaped or installed as illustrated in the drawings. Also, the number of the reflectors RF may differ from that illustrated in the drawings. For example, the shape, the installation position, and the number of the reflector(s) RF may be determined in accordance with the shape, the position, and the like of an opening (e.g., first opening 21 or second opening 22).

The in-vehicle device is not limited to the sun visor 11. That is, the in-vehicle device may be a device capable of changing its orientation, in which the speaker SP for emitting sound to the listener can be installed. For example, the in-vehicle device may be a rear-view mirror or a door.

It should be noted that the moving body is not limited to a vehicle and may be a moving body on which at least one person can ride.

Comparative Example

Figure 13:
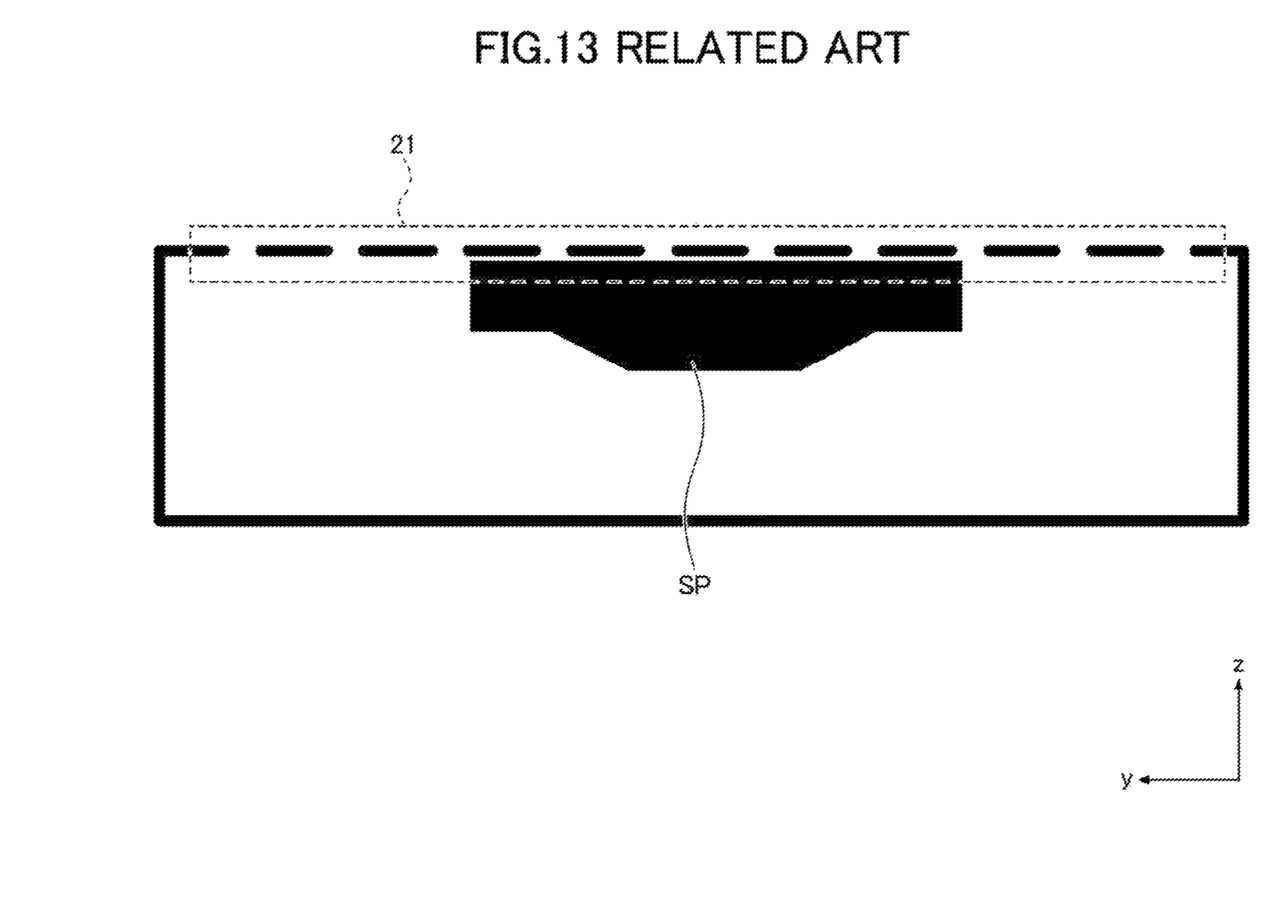
FIG. 13 is a cross-sectional view illustrating an in-vehicle device according to a comparative example.

FIG. 13 is a cross-sectional view illustrating an in-vehicle device according to a comparative example. In the comparative example, a speaker SP is positioned horizontally rather than at a predetermined angle, when the in-vehicle device is in the state illustrated in FIG. 4. In the comparative example, only the first opening 21 is provided as an opening.

In the configuration of the comparative example, in the state illustrated in FIG. 4, for example, sound emitted from the speaker SP is output from the first opening 21. As illustrated in FIG. 4, because the first opening 21 faces the ceiling, the sound is directed toward the ceiling. Thus, in the configuration of the comparative configuration, sound is not transmitted to the listener easily in many cases.

It should be noted that the present invention is not limited to the configurations or the like described above. In other words, embodiments can be modified and added without departing from the spirit of the present invention, and can be appropriately defined depending on its application.

What is claimed is:

1. An in-vehicle device installed in a moving body, the in-vehicle device comprising:
   a speaker unit configured to emit sound in a first direction;
   a reflector unit configured to reflect the sound in a second direction different from the first direction;
   a mechanical unit configured to change the second direction; and
   an opening part from which the sound is output; wherein
   the speaker unit is installed in the in-vehicle device at a predetermined angle with respect to the opening part, and
   the opening part is provided with a plurality of openings each directed toward a different direction.

2. The in-vehicle device according to claim 1, wherein the mechanical unit is configured to change a reflection angle of the reflector unit.

3. The in-vehicle device according to claim 1, wherein the reflector unit is provided with a plurality of reflectors, and the reflector unit further includes a connecting mechanism connecting the plurality of reflectors.

4. The in-vehicle device according to claim 1, wherein the speaker unit is provided with a plurality of speakers.

5. The in-vehicle device according to claim 1, wherein the in-vehicle device is a sun visor.

6. An audio output system comprising:
   the in-vehicle device according to claim 1; and
   an audio signal processor configured to generate an audio output signal that is transmitted to the speaker unit.

* * * * *